United States Patent [19]
Campbell et al.

[11] Patent Number: 5,790,014
[45] Date of Patent: Aug. 4, 1998

[54] CHARGING A TRANSPONDER IN A SECURITY SYSTEM

[75] Inventors: Scott O. Campbell; Lawrence Peter Kirk, both of Canton, Mich.; David Philip Laude, Colorado Springs; Luke Aaron Perkins, Security, both of Colo.; William David Treharne, Farmington Hills, Mich.

[73] Assignee: Ford Motor Company, Dearborn, Mich.

[21] Appl. No.: 844,569

[22] Filed: Apr. 21, 1997

[51] Int. Cl.$^6$ ............................................. B60R 25/10
[52] U.S. Cl. ............... 340/426; 340/825.34; 340/825.31; 307/10.4; 307/10.5; 342/44
[58] Field of Search .................... 340/426, 425.5, 340/825.54, 825.31, 825.72, 825.34, 543, 572, 505; 235/382, 382.5; 342/51, 30, 44; 307/9.1–10.8

[56] References Cited

U.S. PATENT DOCUMENTS

| | | | |
|---|---|---|---|
| 3,981,011 | 9/1976 | Bell, III | 342/44 |
| 4,918,955 | 4/1990 | Kimura et al. | 70/277 |
| 5,053,774 | 10/1991 | Schuermann et al. | 340/438 |
| 5,227,798 | 7/1993 | Hildebrand | 342/51 |
| 5,294,931 | 3/1994 | Meier | 342/44 |
| 5,355,137 | 10/1994 | Schurmann | 342/42 |
| 5,461,386 | 10/1995 | Knebelkamp | 342/44 |
| 5,483,193 | 1/1996 | Kennedy et al. | 329/300 |
| 5,523,746 | 6/1996 | Gallagher | 340/825.31 |
| 5,541,604 | 7/1996 | Meier | 342/42 |
| 5,561,420 | 10/1996 | Kleefeldt et al. | 340/825.31 |
| 5,616,966 | 4/1997 | Fischer et al. | 307/10.5 |
| 5,625,349 | 4/1997 | Disbrow et al. | 340/825.31 |

FOREIGN PATENT DOCUMENTS 0-301-127-A1  7/1987  European Pat. Off.

*Primary Examiner*—Jeffery Hofsass
*Assistant Examiner*—Daryl C. Pope
*Attorney, Agent, or Firm*—Mark Mollon

[57] ABSTRACT

A security system utilizing a key-mounted transponder achieves fast and accurate charging of the transponder by using a frequency search and acquisition phase which attempts partial charging pulses at a plurality of spaced frequencies. After a successful partial charging, a frequency calibration signal is received from the transponder which provides a reference in the transceiver for producing a pulse for fully charging the transponder. Frequency search and acquisition allows robust system operation while using low cost and low tolerance parts.

13 Claims, 4 Drawing Sheets

CHARGING A TRANSPONDER IN A SECURITY SYSTEM

BACKGROUND OF THE INVENTION

The present invention relates in general to a method and apparatus for charging a transponder in a security system, and more specifically, to the search and acquisition of the transponder charging frequency in order to reduce the cost of manufacturing a security system and increasing the amount of charge accumulated by the transponder.

A transponder is a device which receives energy from a coincident energy field, stores energy within the transponder, and emits a response signal after being charged. A transceiver generates the energy field whenever a control module determines that a transponder is located in nearby proximity. In an automotive security system, for example, a transponder embedded in the head of an ignition key is interrogated by a transceiver in response to insertion of a key into an ignition lock cylinder.

In order to sufficiently charge the transponder to permit successful transmission of its stored security code information, it is necessary that the charging field correctly match the resonant frequency of the transponder. A mismatch in frequency results in inadequate accumulation of energy by the transponder. In order to ensure an adequate transfer of energy, prior art devices have used techniques to control the frequency of the transponder and the transceiver, such as using quartz crystal oscillators and trimmed resonant networks. Use of these techniques increases the cost of the security system.

In addition, the resonant frequency of a transponder circuit varies according to environmental conditions such as temperature and humidity. Furthermore, structures nearby the transponder and transceiver can modify the resonant frequency. For these reasons, there may be a loss of efficiency in charging the transponder. Compensating for the inefficiency by using a higher strength charging field is undesirable due to additional cost of components and the potential interference caused if the higher strength transmission inadvertently charges another transponder on a second key on the same keychain (any signal transmitted from any other transponders would interfere with the transmission of the first transponder). An important performance measure for a vehicle security system is the amount of time required to verify the validity of an authorized key and transponder. The operation should be fast enough so that no delays are noticed by the user. Thus, charging efficiency should be optimized to reduce the amount of time required for fully charging the transponder.

A frequency mismatch between the charging field and the resonant frequency of the transponder not only increases the charging time, but it also limits the total charge that can be accumulated in the transponder. In order to maximize the total charge acquired by the transponder and thereby increase reliability of the transponder operation, the transceiver must reduce or eliminate any frequency mismatch.

SUMMARY OF THE INVENTION

The present invention has the advantages that a transponder is quickly and accurately charged with high efficiency while using low cost components not requiring an accurate frequency reference or trimming.

The present invention uses frequency search and acquisition techniques to quickly identify transceiver settings which most efficiently will charge the transponder. The security system operates adaptively to provide fast operation using a low cost system.

In one aspect, the invention provides a method for adaptively energizing a transponder using a charging electromagnetic field created by a transceiver in a security system. A partial charging electromagnetic field is transmitted in a manner providing a plurality of spaced frequency components so that one of the spaced frequency components energizes the transponder by an amount causing it to produce a partial transmission, thereby providing a calibration signal for identifying a frequency upon which said transponder will be transmitting. The spaced frequency components are substantially evenly spaced according to a spacing interval between a minimum frequency and a maximum frequency, the spacing interval being less than or equal to a receiving bandwidth of the transponder. Energy is stored in the transponder from the partial charging electromagnetic field. The transponder detects when the partial charging electromagnetic field ends. A partial transmission is transmitted from the transponder including the frequency calibration signal. The frequency calibration signal is received by the transceiver. Then, a full charging electromagnetic field is transmitted substantially limited to a single frequency component which is determined in response to the frequency calibration signal. The transponder stores energy from the full charging electromagnetic field and transmits a full transmission including a security code.

DETAILED DESCRIPTION OF PREFERRED EMBODIMENTS

Figure 1:
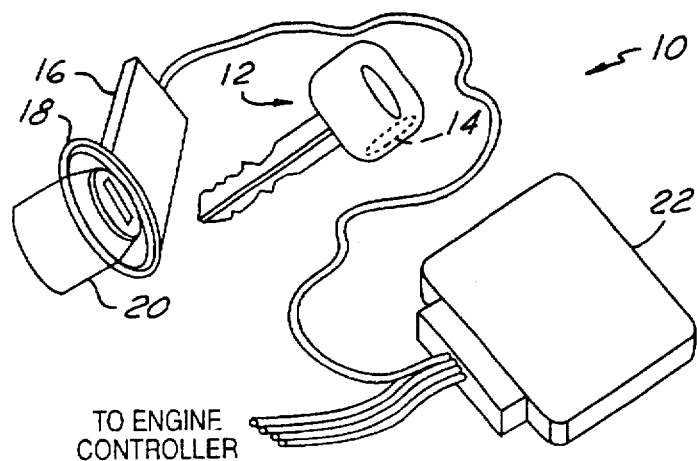
FIG. 1 is a system level diagram showing a vehicle security system.

Referring to FIG. 1, a passive anti-theft system is generally indicated at 10. The passive anti-theft system includes an ignition key 12 having a transponder 14 embedded in the head of the key. A transceiver 16 is connected to an antenna coil 18 which is installed at the end of a key-lock cylinder 20. Transceiver 16 is connected to an anti-theft control module 22 which is also connected to an electronic engine controller through a wiring harness in the vehicle.

Transponder 14 does not include a battery but is instead powered from a charging electromagnetic field produced by antenna coil 18. Transponder 14 includes an antenna for picking up the charging field and an energy storage circuit for accumulating sufficient charge to operate its own transmitter and control circuits. After creating the charging field, transceiver 16 enters a receive mode for receiving a security code transmitted by transponder 14. The received signal is decoded in control module 22 and compared with the codes which are authorized for the particular vehicle which are stored in control module 22. If a correct security code is received then a validation signal is sent to the electronic engine controller to allow engine operation.

Figure 2:
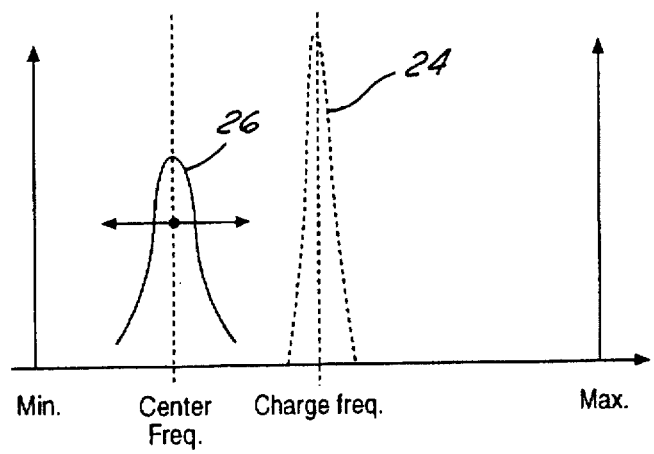
FIG. 2 is a power spectrum plot showing the relationship between the transponder resonant frequency and a charging frequency.

FIG. 2 shows the relationship between a charge frequency spectrum 24 and a transponder receive spectrum 26. Through use of expensive components, the two frequency spectra can be accurately controlled to reasonably assure overlap such that the transponder can be adequately charged by the charging field at the charging frequency. However, frequency shifts inevitably result due to environmental conditions. Thus, excessive energy may need to be provided in the charging field in order to insure an adequate charge when the transponder bandwidth and the charging frequency do not coincide precisely. Furthermore, it would be desirable to avoid the expensive components required by close frequency control by using an adaptive charging system which only needs to rely on an assumption that the transponder resonant frequency lies between a predetermined minimum frequency and predetermined maximum frequency (to place limits on the search for the actual frequency). In particular, the charging frequency is modified within these limits until the resonant frequency of the transponder is located.

In the present invention, adaptive charging frequency search and acquisition uses a search phase wherein only a partial charging field is produced, i.e., a reduced charge energy (as determined by the length of the charging pulse) is reduced to the point where the transponder will have sufficient energy to begin its transmission cycle provided that the charging frequency being attempted is within a predetermined spacing from the transponder's resonant frequency. The charging frequency is adaptively modified until it falls within the receiving bandwidth of the transponder and a detectable transmission cycle is produced by the transponder.

Figure 3:
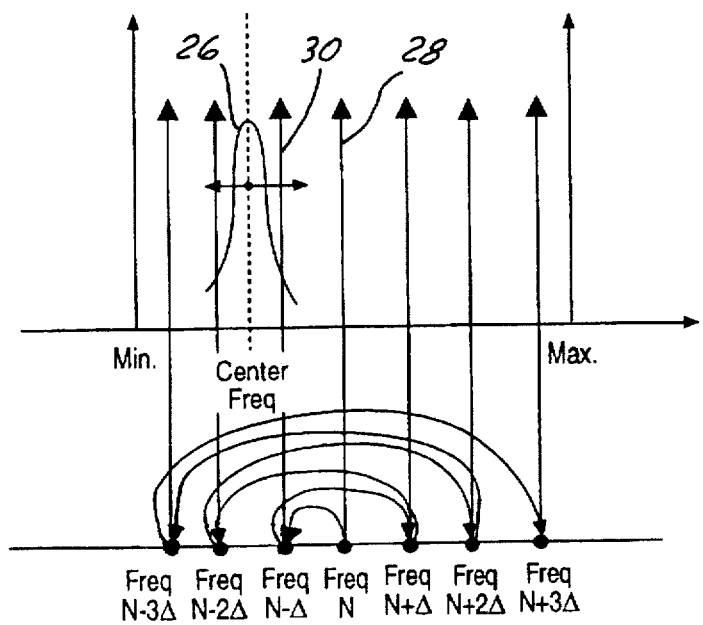
FIG. 3 illustrates a frequency hop sequence for partial charging of the transponder according to the present invention.

FIG. 3 shows a preferred method for locating the transponder resonant frequency herein referred to as a frequency hop sequence. The frequency hop sequence includes a plurality of spaced frequency components between the predetermined minimum and predetermined maximum frequencies of the transponder. The spaced frequency components are substantially evenly spaced according to a spacing interval which is less than or equal to the receiving bandwidth of the transponder. The spacing interval is referred to herein as $\Delta$. A first frequency component 28 of the frequency hop sequence is transmitted at a frequency midway between the minimum and maximum frequencies since that is the most likely resonant frequency for the transponder. A brief partial charging pulse is produced followed by a brief listening interval wherein the transceiver attempts to receive a calibration signal from the transponder. If no calibration signal is received then the frequency hop sequence continues with new frequencies following a hop sequence which alternates above and below first frequency component 28. Thus, a second partial charging pulse is produced at a spaced frequency component 30 having a center frequency $N-\Delta$, wherein N is the first frequency. The next frequency hop component is at frequency $N+\Delta$. The sequence continues to alternate with frequencies at $N-2\Delta$, $N+2\Delta$, $N-3\Delta$, and $N+3\Delta$. In the example of FIG. 3, bandwidth 26 of the transponder lies in a position such that spaced frequency component 30 will provide sufficient energy to the transponder during the partial charging pulse for the transponder to produce a frequency calibration signal. The frequency calibration signal is detected by the transceiver and is measured to determine the frequency to be used for a full charging of the transponder.

Figure 4:
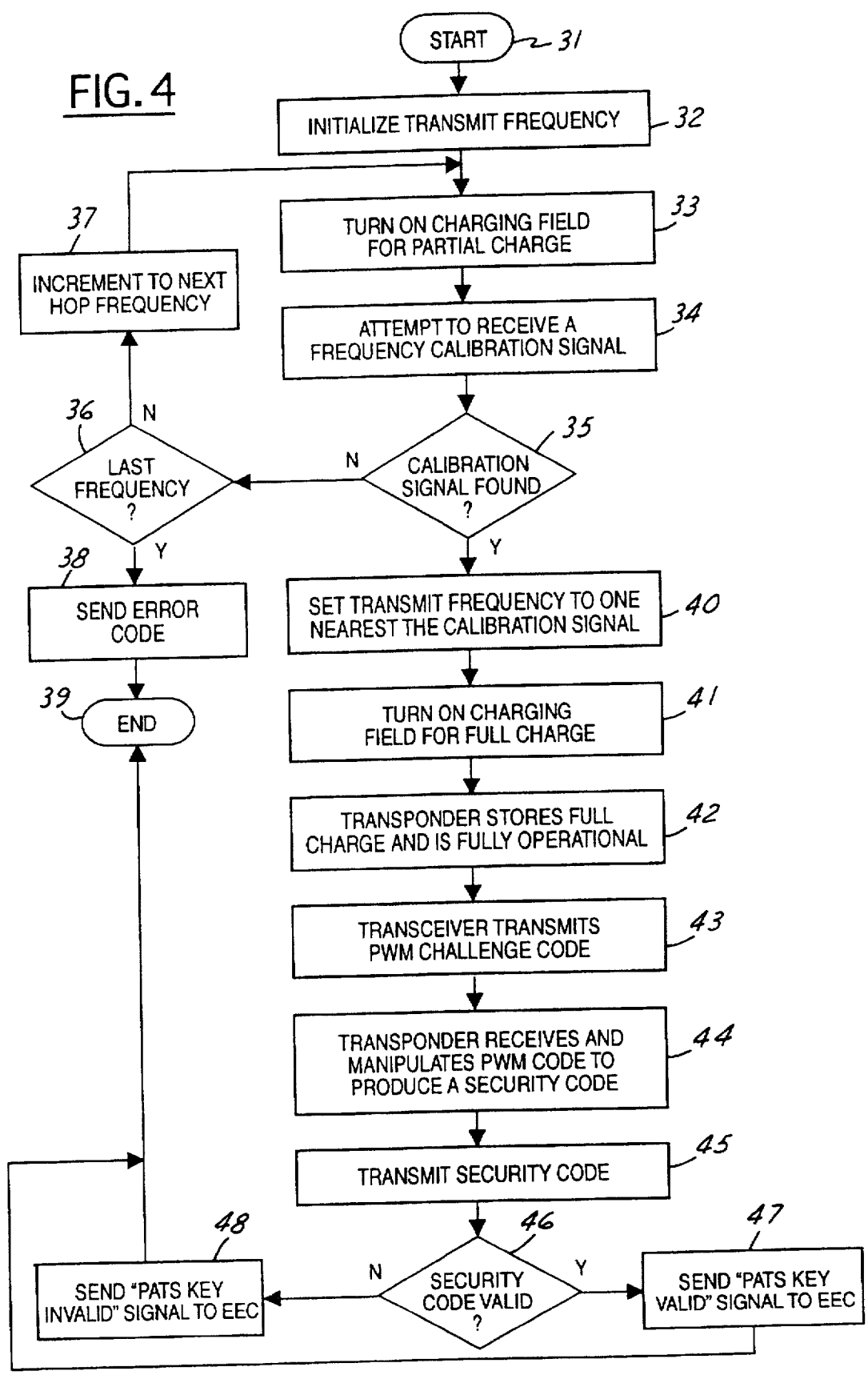
FIG. 4 is a flow chart showing a preferred embodiment of the present invention.

FIG. 4 shows a preferred method of the present invention. A passive anti-theft interrogation sequence starts in step 31 when a key is inserted into the key lock cylinder, tripping a mechanical switch and sending a signal to the anti-theft control module that a key has been inserted. The anti-theft control module signals the transceiver to interrogate the transponder in the key. In step 32, the transceiver initializes its transmit frequency to frequency N for the frequency search and acquisition procedure. The transceiver turns on the charging field for a length of time to produce a partial charge of the transponder (e.g., 15 milliseconds) in step 33. In step 34, the transceiver attempts to receive a frequency calibration signal from the transponder by listening for a received signal during a listening interval (e.g., 1.5 mS). The frequency calibration signal is typically comprised of a preamble in the transponder transmission during which the transponder transmits at its resonant frequency.

In step 35, the transceiver detects whether a calibration signal was received. If no calibration signal is found, then a check is made in step 36 to determine whether the last frequency in the frequency hop sequence has been transmitted. If not, then the frequency is incremented to the next hop frequency in step 37 and the new frequency is used to turn on the charging field for a partial charge in step 33. If the last frequency in the hop sequence has been transmitted, then an error code is sent to the anti-theft control module in step 38 and the procedure ends at step 39.

If a calibration signal is found in step 35, then the transmit frequency of the transceiver is set according to the calibration signal. As part of its receive function and in order to accurately decode frequency-shift keying modulated signals from the transponder, the transceiver measures the frequency of the transponder transmission. This measured frequency is used in step 40 to adapt the transceiver transmission to most closely match the transponder center frequency. Depending on the resolution of the transceiver, the transmit frequency may be set at one of the frequencies in the frequency hop sequence or to a frequency between frequencies in the frequency hop sequence in order to maximize transponder charging efficiency. Once the transmit frequency is set, the transceiver turns on a full charging field for a full charge in step 41 (e.g., a charge pulse duration of 30–50 mS). The transponder stores its full charge and becomes fully operational in step 42. The transponder detects when the charge pulse ends and enters a transmit mode. The transponder may transmit a fixed code in the case of a "read only" transponder (in which case, steps 43 and 44 would be skipped). In the preferred embodiment, however, a "read/write" transponder is programmed to accept data in the transmission from the transceiver, execute a predetermined secret algorithm to manipulate data, and transmit a security code responsive to data from the transceiver. This type of security system is referred to as a challenge-response system. These systems provide additional security since the code transmitted by the transponder varies depending upon the received data thereby preventing easy copying of the security code from a transponder transmission.

In step 43, the transceiver transmits a pulse-width modulated (PWM) challenge code comprised of a digital data string encoded in respective pulse widths from the transceiver. In step 44, the transponder receives the digital code and manipulates it according to its stored procedure to produce a security code. The transponder transmits the security code in step 45 using frequency-shift keying modulation.

In step 46, the security code transmitted by the transponder is compared by the anti-theft control module with the security code which it derived by using the same stored secret algorithm. If the security code is valid, then the anti-theft control module sends a "PATS key valid" signal to the electronic engine control and the method ends at step 39. If the security code is invalid, then the anti-theft control module sends a "PATS key invalid" signal to the electronic engine control in step 48 and the method ends in step 39.

Figure 5:
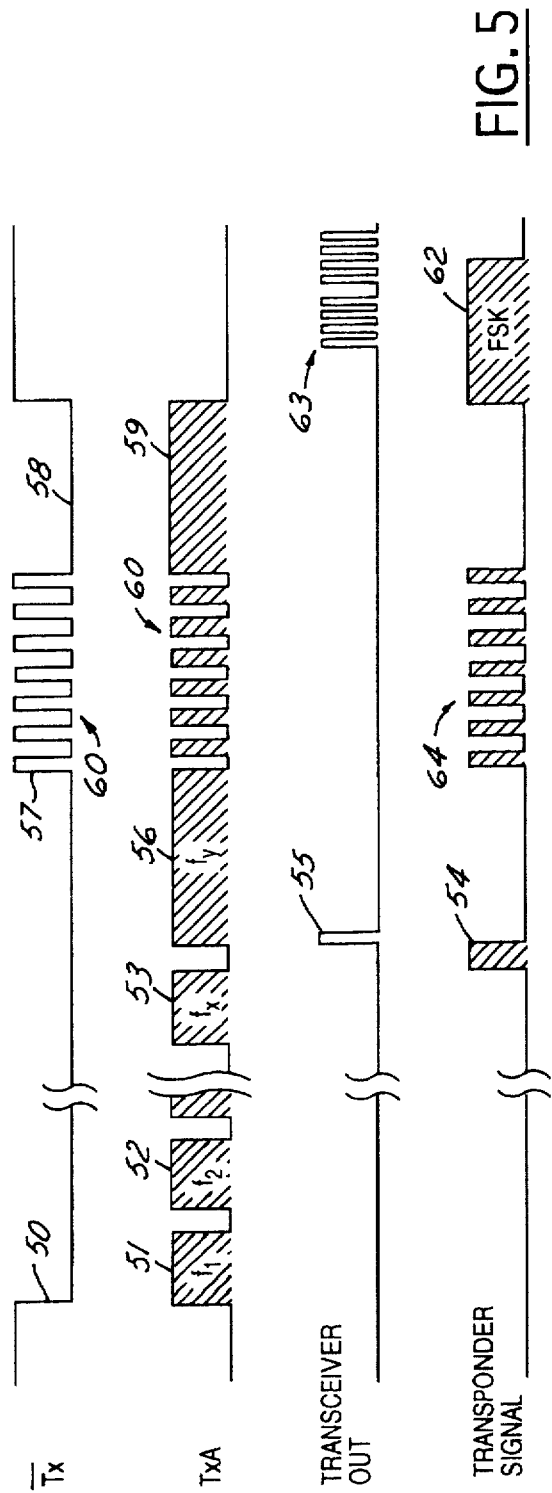
FIG. 5 is a timing diagram showing signals present during operation of the present invention.

FIG. 5 shows some signal waveforms present during operation of the present invention. A signal NOT Tx is a transmission control signal which is provided from the anti-theft control module to the transceiver. When this inverted signal is low, the transceiver transmits at its set frequency. At a first negative transition 50, the transceiver initiates its frequency search and acquisition process. The transceiver transmit signal shown as TxA is the signal envelop for a first partial charging pulse 51 having a frequency $f_1$, a second partial charging pulse 52 having a frequency $f_2$ and a final partial charging pulse 53 at a frequency $f_x$. The final pulsing charging pulse 53 may be any one of the first through the last of the frequency hop sequence as described above. At the end of partial charging pulse 53, the transponder transmits its preamble at 54, thereby indicating that the proper partial charging frequency has been located. Upon detecting the transponder calibration frequency signal, the transceiver outputs a diagnostic code 55 that informs the anti-theft control module that the resonant frequency of the transponder has been acquired. After sending this diagnostic code, the transceiver begins transmitting a full charging pulse 56 with a frequency $f_y$ determined in accordance with the frequency of the frequency calibration signal as discussed above. Upon receiving the diagnostic code 55, the anti-theft control module begins measuring the full charging time for pulse 56 and switches the state of the NOT Tx signal at 57 when the full charging time expires. Thereafter, the anti-theft control module toggles the value of NOT Tx to form the pulse width modulated code of the challenge signal to be transmitted to the transponder. Thus, the NOT Tx signal includes pulse-width modulated signals 60 thereby producing transmission of a PWM code from the transceiver indicated at 61. The transponder may begin a transmission cycle after each PWM signal as shown at 64, but these do not interfere with the detection of the PWM signal. Additional charging of the transponder may also be performed as shown at 58 and 59 by continuing transmission by the transceiver.

Following transmission of the PWM code, the transponder calculates the correct response to the challenge code. For example, the PWM code may provide a digital number which is operated upon within the transponder according to a predetermined mathematical formula to produce a unique security code. This security code is transmitted by the transponder via an FSK signal 62. As this FSK signal is received by the transceiver, it is converted into a digital code which is transmitted from the transceiver output to the anti-theft control module as a series of digital bytes 63.

Figure 6:
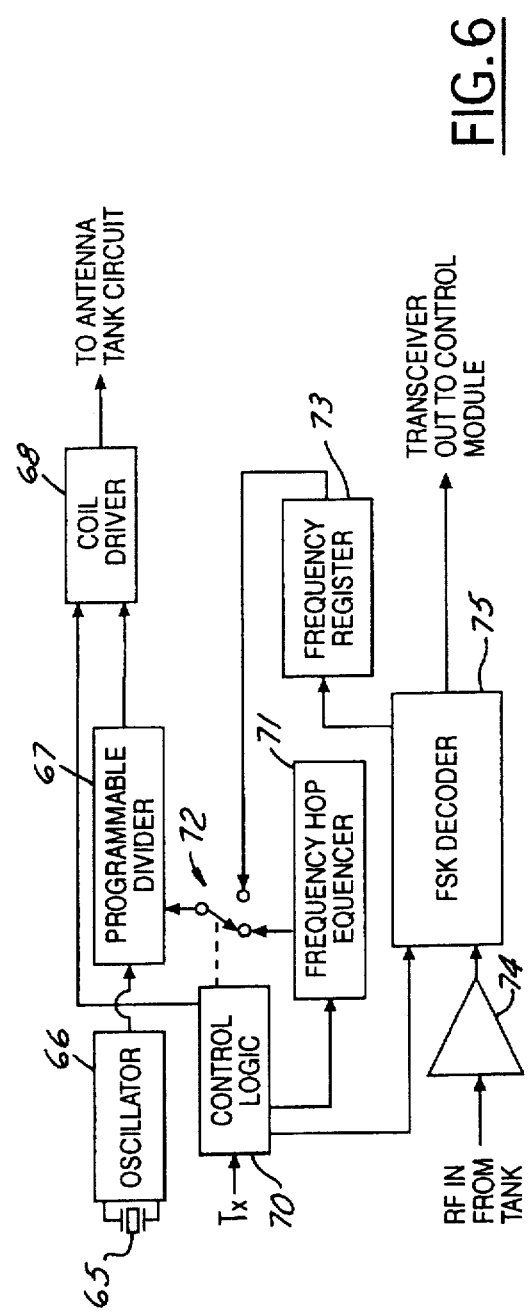
FIG. 6 is a block diagram showing a preferred embodiment of a transceiver according to the present invention.

FIG. 6 shows transceiver circuitry according to a preferred embodiment. A ceramic resonator 65 and an oscillator 66 produce a reference frequency signal which is coupled to the input of a programmable divider 67. The output of programmable divider 67 is connected to one input of a coil driver 68. The outputs of coil driver 68 are connected to an antenna tank circuit which includes the antenna coil surrounding the key-lock cylinder.

The transmit signal Tx from the anti-theft control module is connected to the input of a control logic block 70. Control logic 70 controls the operation of a frequency hop sequencer 71 and toggles a single-pull, double-throw switch 72 for inputting either the output of frequency hop sequencer 71 or a frequency register 73 to the input of programmable divider 67.

An RF input from the antenna tank circuit is connected to the input of a receiver amplifier 74. Amplifier 74 provides high gain and performs a limiter function to recover the square-wave signal transmitted by the transponder. The output of amplifier 74 is connected to one input of an FSK decoder 75. During the frequency search and acquisition phase, FSK decoder 75 outputs a signal to be stored in frequency register 73 corresponding to the frequency calibration signal sent by the transponder. During normal receive operation, FSK decoder 75 provides decoded FSK information including the security code to the anti-theft control module. In addition, FSK decoder 75 provides other coded signals to the control module as determined by control logic block 70, such as an error code or the diagnostic code indicating capture of the transponder resonant frequency.

Figure 7:
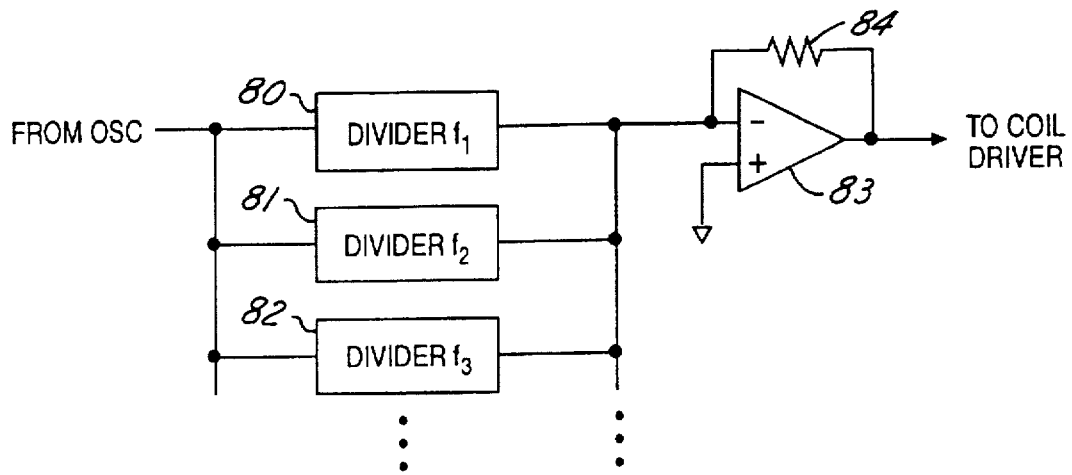
FIG. 7 is a block diagram showing an alternative embodiment for producing partial charging signals in the present invention.

FIG. 7 shows an alternative embodiment wherein the transponder resonant frequency can be determined in a shorter time by transmitting the plurality of spaced frequency components simultaneously. The reference frequency signal from the oscillator is coupled to the input of dividers 80, 81, 82, and additional dividers that are not shown. Each divider produces a respective frequency component at frequency $f_1$, $f_2$, $f_3$, and so on. The multiple output frequency components are summed in a summing amplifier 83 which includes a feedback resistor 84. The output of the summing amplifier is coupled to the coil driver which produces all the frequencies simultaneously and ensures a partial charging of the transponder in a minimum time. Although the circuit of FIG. 7 can provide any desired spacing of components, the plurality of spaced frequency components are preferably equally spaced as in FIG. 3 and are equal in magnitude as in FIG. 3. An uneven frequency spacing could be used in the event that the transponder natural frequencies were known to follow certain statistical distributions, for example.

Rather than simultaneously transmitting all the frequency components at once, the frequency components could be put into groups with sequential transmission of the groups (the frequency components of each group being transmitted simultaneously).

Figure 8:
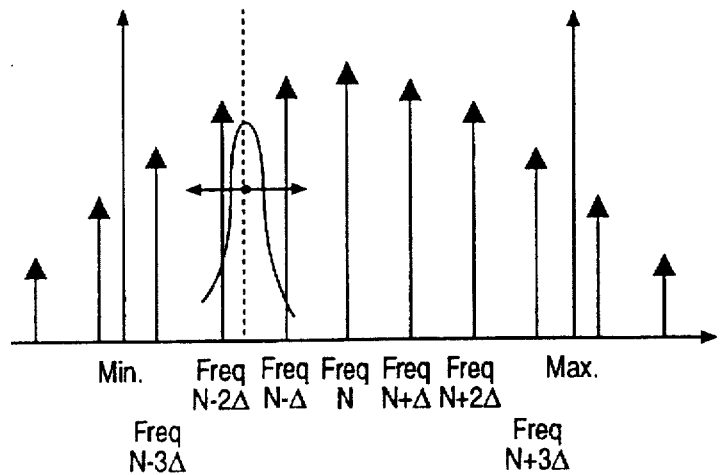
FIG. 8 is a power spectrum showing charging signals produced according to yet another alternative embodiment of the present invention.
Figure 9:
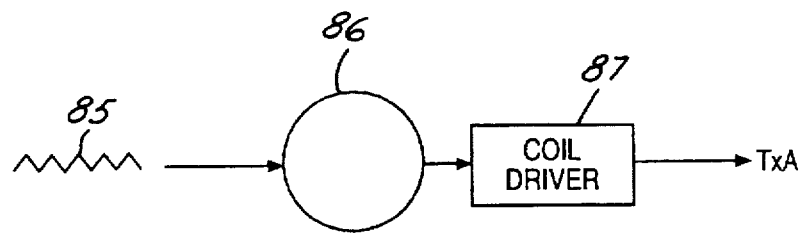
FIG. 9 is a block diagram showing circuitry to provide the power spectrum of FIG. 8.

FIGS. 8 and 9 show an alternative embodiment for producing simultaneous transmission of the spaced frequency components wherein the magnitudes of the spaced frequency components correspond to an envelop characterized by a Bessel function. Such a partial charging spectrum can be produced by frequency modulating a triangle wave as shown in FIG. 9. A triangle wave 85 from a signal generator (not shown) is input to a frequency modulator 86. The frequency modulated output is connected to the input of coil driver 87 for producing the spaced frequency components of FIG. 8.

What is claimed is:

1. A method for adaptively energizing a transponder using a charging electromagnetic field created by a transceiver in a security system, said method comprising the steps of:

transmitting a partial charging electromagnetic field in a manner providing a plurality of spaced frequency components so that one of said spaced frequency components energizes said transponder by an amount causing it to produce a partial transmission, thereby providing a calibration signal for identifying a frequency upon which said transponder will be transmitting, said spaced frequency components being spaced between a minimum frequency and a maximum frequency;

storing energy in said transponder from said partial charging electromagnetic field;

detecting within said transponder the ending of said partial charging electromagnetic field;

transmitting a partial transmission from said transponder including a frequency calibration signal;

receiving said frequency calibration signal in said transceiver;

transmitting a full charging electromagnetic field substantially limited to a single frequency component, said single frequency component determined in response to said frequency calibration signal;

storing energy in said transponder from said full charging electromagnetic field; and transmitting a full transmission from said transponder including a security code.

2. The method of claim 1 wherein said spaced frequency components are substantially evenly spaced according to a spacing interval, said spacing interval being less than or equal to a receiving bandwidth of said transponder.

3. The method of claim 1 wherein said plurality of spaced frequency components are transmitted sequentially.

4. The method of claim 1 wherein said plurality of spaced frequency components are transmitted simultaneously.

5. The method of claim 3 wherein said transceiver attempts to receive said frequency calibration signal after each sequential transmission of a respective spaced frequency component, and wherein further transmissions of said spaced frequency components are terminated once said frequency calibration signal is received.

6. The method of claim 3 wherein a frequency of sequentially transmitted frequency components follows a predetermined hop sequence commencing with a center frequency substantially midway between said minimum frequency and said maximum frequency.

7. The method of claim 6 wherein said hop sequence alternates above and below said center frequency in successive transmissions.

8. The method of claim 1 wherein said frequency calibration signal is comprised of a beginning portion of a programmed response message of said transponder using frequency-shift keying modulation, said beginning portion consisting of a transmission at a resonant frequency at which said transponder charges and corresponding to one modulation frequency of said frequency-shift keying modulation.

9. The method of claim 1 wherein said single frequency component used for said full charging electromagnetic field is selected as a closest transmittable frequency of said transceiver to the frequency of said frequency calibration signal.

10. The method of claim 9 wherein said single frequency component is not equal in frequency to any of said plurality of spaced frequency components.

11. The method of claim 1 further comprising the steps, following said storing of energy in said transponder from said full charging electromagnetic field, of:

transmitting a pulse-width modulated code from said transceiver to said transponder; and determining said security code in said transponder by manipulating said pulse-width modulated code according to a predetermined procedure stored in said transponder.

12. Transceiver apparatus for adaptively charging a transponder using a charging electromagnetic field created by said transceiver apparatus in a security system, said transceiver apparatus comprising:

a transceiver antenna for exchanging transmissions with said transponder when said transponder is located in the vicinity of said transceiver;

an oscillator producing a reference frequency signal;

a programmable divider coupled to said oscillator for selectably dividing said reference frequency signal to produce selected frequency signals;

a frequency hop sequencer coupled to said programmable divider for commanding said programmable divider to produce said selected frequency signals according to a frequency hop sequence during a partial charging of said transponder;

a frequency-sensitive decoder coupled to said transceiver antenna for receiving a charging frequency calibration signal from said transponder after partial charging thereof, said frequency-sensitive decoder identifying a specific frequency of said charging frequency calibration signal; and a natural frequency register coupled to said frequency-sensitive decoder and said programmable divider, said natural frequency register causing said programmable divider to produce a charging signal corresponding to said specific frequency during a full charging of said transponder.

13. Transceiver apparatus for adaptively charging a transponder using a charging electromagnetic field created by said transceiver apparatus in a security system, said transceiver apparatus comprising:

a transceiver antenna for exchanging transmissions with said transponder when said transponder is located in the vicinity of said transceiver;

an oscillator producing a reference frequency signal;

a signal generator producing a plurality of spaced frequency components simultaneously between at least a minimum frequency and a maximum frequency during a partial charging of said transponder;

a frequency-sensitive decoder coupled to said transceiver antenna for receiving a charging frequency calibration signal from said transponder after partial charging thereof, said frequency-sensitive decoder identifying a specific frequency of said charging frequency calibration signal;

a natural frequency register coupled to said frequency-sensitive decoder for storing a value proportional to said specific frequency; and a programmable divider coupled to said natural frequency register and said oscillator for dividing said reference frequency signal to produce a charging signal corresponding to said specific frequency during a full charging of said transponder.

* * * * *